UNITED STATES PATENT OFFICE.

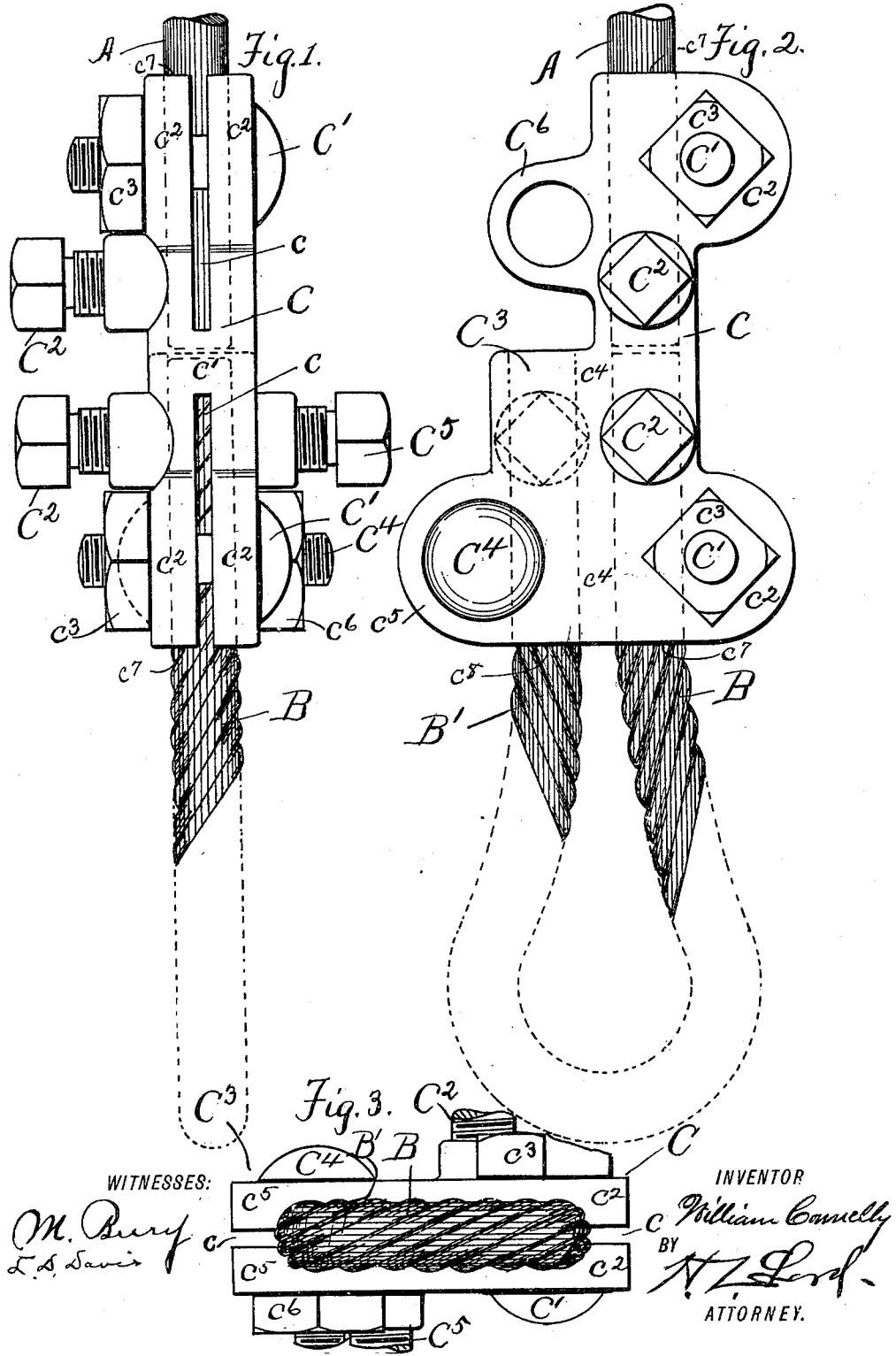

WILLIAM CONNELLY, OF TOLEDO, OHIO, ASSIGNOR TO ROBERT E. CONNELLY, OF SAME PLACE.

ROD AND CABLE COUPLING.

SPECIFICATION forming part of Letters Patent No. 626,527, dated June 6, 1899.

Application filed December 14, 1898. Serial No. 699,235. (No model.)

*To all whom it may concern:*

Be it known that I, WILLIAM CONNELLY, a citizen of the United States, residing at Toledo, in the county of Lucas and State of Ohio, have invented certain new and useful Improvements in Rod and Cable Couplings; and I do hereby declare the following to be a full, clear, and exact description of the invention, such as will enable others skilled in the art to which it appertains to make and use the same.

This invention relates to rod and cable couplings; and it consists in certain improvements in the construction thereof, as will be hereinafter more fully described, and pointed out in the claims.

My invention is illustrated by a coupling which is particularly adapted for connecting surface rods or cables used in pumping oil-wells, as follows:

Figure 1 shows an elevation, the point of view being from the right of Fig. 2. Fig. 2 shows an elevation, the point of view being from the left of Fig. 1. Fig. 3 shows an end elevation of the device, the point of view being from the bottom of Figs. 1 and 2.

C marks the coupling, which comprises a piece of metal having the longitudinal opening $c^7$ (see dotted lines) for the introduction of the rods. The coupling is provided with the ear $c^2$, through which are passed the bolts C', on which are screwed the nuts $c^3$. A slot $c$ extends longitudinally through one side of the coupling into the opening $c^7$. The metal is preferably connected at the center $c'$. In practice the rod A is inserted in the opening $c^7$ and the nuts $c^3$ screwed down with sufficient force to spring the metal coupling, so as to securely clamp the rod. The clamping effect by this means is limited to the frictional resistance of the walls almost entirely. It is preferable, therefore, to supplement the clamp formed by the bolt C' by the set-screws $C^2$, which are preferably placed near the center of the coupling adjacent to the bridge of metal $c'$. As these set-screws are forced against the rod A they indent it more or less, thus strengthening their engagement.

The coupling may be used for coupling two rods, as A, or two cables, as B, or rods and cables, as shown. A ring $C^6$ is provided in the back of the coupling for attaching the supporting means where the coupling is used on surface-rods. At one end of the coupling there is a supplemental clamp $C^3$, having the opening $c^8$. (See dotted lines therein.) A wall of metal $c^4$ separates the openings $c^7$ and $c^8$. A clamping-bolt $C^4$, having the nut $c^6$, is passed through an ear $c^5$ in the supplemental clamp $C^3$. A set-screw $C^5$ is arranged opposite to one of the set-screws $C^2$ and is used in a like manner to the set-screw $C^2$. By passing the set-screw $C^5$ and bolt $C^4$ in opposite directions from that of the set-screw $C^2$ and bolt C' the set-screws $C^5$ and nut $c^6$ can more readily be engaged by a wrench.

Where the device is used for a coupling simply for surface-rods, the auxiliary clamping portions $C^3$ may be omitted or need not be used if present. It is useful in forming a loop with which to secure the end of a line of rods or cables.

The coupling as a whole is preferably formed of an integral casting.

What I claim as new is—

1. In a rod-coupling, the combination of the coupling portion, C, formed of an integral piece of metal having the opening, $c^7$, and slot, $c$, in one side only thereof; and the clamping-bolt, C', therethrough out of the line of the opening $c^7$.

2. In a rod-coupling, the combination of the coupling portion, C, having the opening, $c^7$, and slot, $c$, therein; the bolt, C', therethrough; the auxiliary clamping portion, $C^3$, thereon; and the bolt, $C^4$, therethrough substantially as described.

3. In a rod-coupling, the combination of the coupling portion, C, having the opening, $c^7$, and slot, $c$, therein; the bolt, C', therethrough; the set-screw arranged to engage a rod in the opening, $c^7$; the auxiliary clamping portion, $C^3$; and the bolt, $C^4$, therethrough.

4. In a rod-coupling, the combination of the coupling portion, C, having the opening, $c^7$, and slot, $c$, therein; the bolt, C', therethrough; the set-screw arranged to engage a rod in the opening, $c^7$; the auxiliary clamping portion, $C^3$; the bolt, $C^4$, therethrough; and the set-screw, $C^5$, arranged to engage the rod in the opening, $c^8$.

5. In a rod-coupling, the combination of the coupling portion, C, having the opening, $c^7$, and slot, $c$, therein; the bolt, $C'$, therethrough; the set-screw arranged to engage a rod in the opening, $c^7$; the auxiliary clamping portion, $C^3$; the bolt, $C^4$, therethrough; and the set-screw, $C^5$, arranged to engage the rod in the opening, $c^8$, said set-screws, $C^5$, and $C^2$, being arranged on opposite sides of the coupling portion C, for the purposes described.

6. In a rod-coupling the combination of the coupling portion, C, having the opening, $c^7$, slots, $c\,c$, with the bridge-piece, $c'$, between said slots, and having the ears, $c^2$, thereon; bolts, $C'\,C'$, arranged through said ears; set-screws $C^2\,C^2$, arranged to engage the rods in the opening, $c^7$; the auxiliary clamping portion, $C^3$, formed integrally with the coupling portion, C, and having the opening, $c^8$, therein separated from the opening, $c^7$, by the wall, $c^4$, and having thereon the ear, $c^5$; the bolt, $C^4$, through the ear, $c^5$; and the set-screw, $C^5$, arranged on the opposite side of said coupling from that of the set-screw, $C^2$.

In testimony whereof I affix my signature in presence of two witnesses.

WILLIAM CONNELLY.

Witnesses:
J. W. LYONS,
THOMAS EMERY.